Oct. 10, 1933.   R. J. NEELY   1,929,709
LIQUID STORAGE TANK
Filed March 22, 1932

INVENTOR
Raymond J. Neely
by
Parker, Brocknow & Hamer
ATTORNEYS

Patented Oct. 10, 1933

1,929,709

UNITED STATES PATENT OFFICE 1,929,709

LIQUID STORAGE TANK

Raymond J. Neely, Little Falls, N. Y., assignor to Cherry-Burrell Corporation, Wilmington, Del., a corporation of Delaware Application March 22, 1932. Serial No. 600,401

3 Claims. (Cl. 220—10)

This invention relates to insulated liquid storage tanks, such as used for the storage of milk.

These tanks, which are commonly of cylindrical form arranged with the axis of the cylinder horizontal and tightly closed, are usually constructed with a lining of nickel, or other suitable metal surrounded by a heat insulating outer casing or jacket and, in some instances, the tank walls are also constructed to provide a space surrounding the lining through which brine or other cooling medium is adapted to be circulated for cooling the contents of the tank for keeping them at a desired temperature. It is essential that tanks used for the storage of milk shall be kept in a thoroughly clean, sanitary condition and, for this purpose, it is usual to provide one of the circular heads of the tank with a man hole closed by a door or cover and conveniently located, as at the lower portion of the tank, through which a person can enter the tank for cleaning it interiorly. Such tanks are also ordinarily equipped with glass covered peep holes through which one can look to ascertain the approximate level of the milk in the tank, the amount of foam, the effect of agitation or other conditions, and with other openings or connections through a wall or walls of the tank serving other purposes, such as for a milk inlet, for the connection of a pressure gauge, air relief valve, or other appliance or adjunct of the tank.

One object of this invention is to construct a tank of the character mentioned so that the necessary openings or connections for the milk inlet, peep hole, air vent or other appliances or purposes are arranged so as to reduce to the minimum the number of holes through the lining and jacket or other parts forming the walls of the tank and the number of joints between the parts of the tank forming such openings.

Other objects are to provide such a storage tank, in addition to the usual manhole door, with a door at the upper portion of the tank, which can be opened to admit light and ventilation to the tank when it is being cleaned and which door is provided with or carries the necessary holes or connections for the milk inlet, air vent, peep hole, or other appliances requiring passages from the exterior to the interior of the tank; and also to provide a storage tank, which has the features of improvement and advantages hereinafter described and set forth in the claims.

Figure 1:
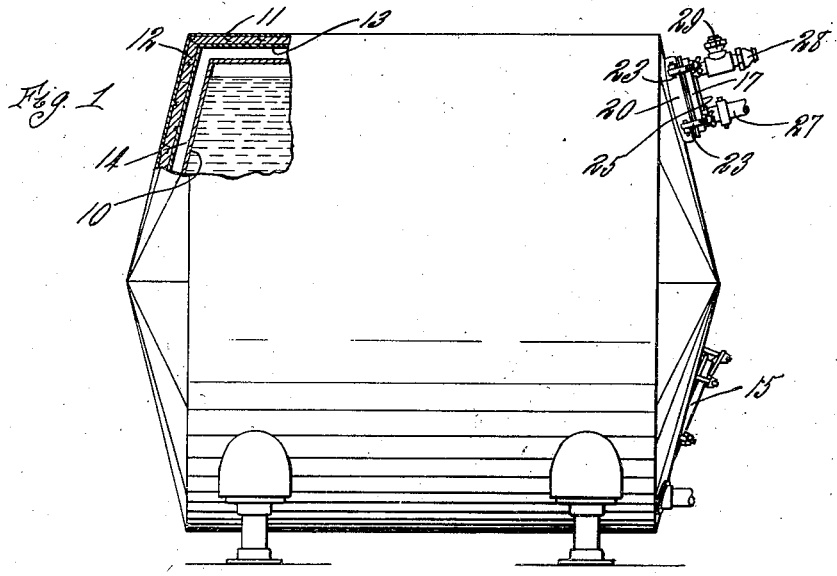
Fig. 1 is a side elevation of an insulated liquid storage tank embodying my invention, a portion of the walls of the tank being broken away to show the sectional construction of the walls.
Figure 2:
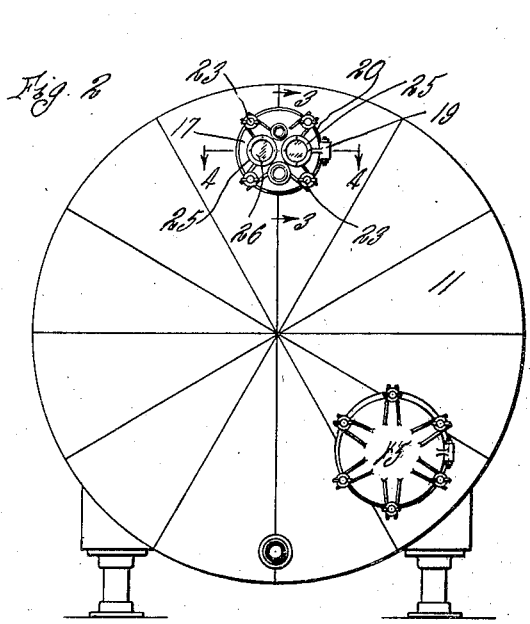
Fig. 2 is a front end elevation of the tank.
Figure 3:
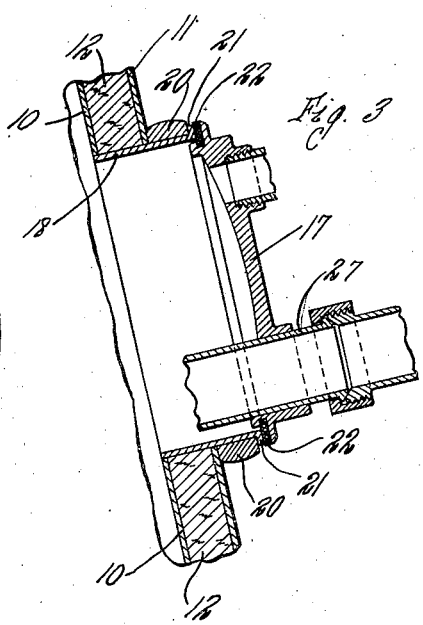
Fig. 3 is a section on an enlarged scale through the upper door of the tank on line 3—3, Fig. 2 but showing a slightly modified wall construction.
Figure 4:
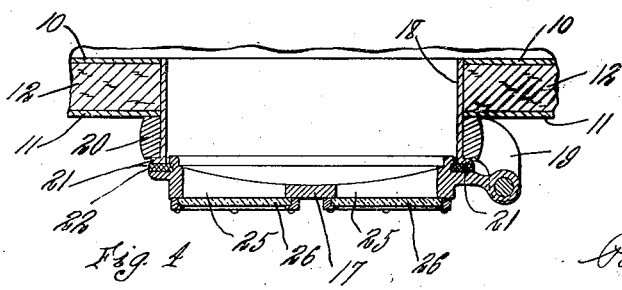
Fig. 4 is a sectional view through the upper door on line 4—4, Fig. 2 and showing the same wall construction as Fig. 3.

The tank, as illustrated in the drawing, is of cylindrical form arranged with axis of the cylinder horizontal and comprises an inner metal lining or shell 10, a jacket or outer casing 11 surrounding the lining and suitable heat insulating material 12 interposed between the walls of the lining and outer casing. The tank, as shown in Fig. 1, is constructed with an intermediate cylindrical shell 13 between which and the outer casing the insulating material 12 is confined and which, together with the inner lining, forms a space 14 surrounding the lining and in which space brine or other suitable medium is adapted to be circulated for cooling the contents of the tank or keeping it at a desired temperature. The tank may be made with or without this cooling space, as preferred, the latter construction being illustrated in Figs. 3 and 4.

One end or head of the tank is provided with the usual manhole closed by a hinged or other suitable door or cover 15. This manhole and door may be of usual construction and are preferably located near the bottom of the tank in a position to enable a person to readily enter the tank for cleaning it or for other purposes.

In addition to this manhole and door 15, the tank is provided, preferably in the upper portion of the same end of the tank, with a second manhole or opening closed by a door or cover 17, which is arranged or mounted so that it can be shut, to tightly close the tank and can be opened to admit air and light to the tank. In the preferred construction, shown in the drawing, this second or upper opening is formed or surrounded by a cylindrical collar 18 joined or secured to the tank lining 10 and projecting outwardly therefrom through registering openings in the insulation 12 and jacket 11 (and also in the intermediate shell 13 when this is used) forming the tank walls, and the door 17 is mounted by a hinge 19 on a supporting or locking ring 20, which surrounds the collar 18, between an outturned annular flange 21 at its outer end and the end wall of the jacket 11. The door 17 is adapted to be closed and tightly secured by suitable fastenings against the flanged outer end of the collar 18. For instance, the door is provided with a rubber or other suitable gasket or packing ring 22 adapted to bear against the outer end of the collar, against which the door is clamped by screws 23 hinged to the supporting ring 20 and provided with wing nuts on the threaded outer ends of the screws and adapted to bear against lugs on the edge of the door 17. However, the door 17 can be mounted on the tank in any other suitable manner permitting the door to be readily opened and tightly closed, and door securing or fastening devices of any other suitable sort can be employed.

The liquid inlet hole or connection, the air vent, valve, pressure gauge or other connections and one or more peep holes are provided in or on this door 17. For instance, as shown in the drawing, the door 17 is provided with two peep holes 25 covered by glass plates or windows 26 and, in addition, is provided with a liquid inlet connection 27 and with a pipe or connection equipped with pressure and vacuum relief valves 28 and 29. These various openings in the door may be used for the purposes stated or for other purposes necessitating holes or passages extending from the exterior to the interior of the tank. By providing or mounting these connections or appliances on the door 17 with the openings through the door for the communication of such devices with the interior of the tank, it is not necessary to make additional or separate holes through the lining insulation, outer jacket or casing, or other wall-forming parts of the tank for the several devices, but a single opening surrounded by a single collar or wall 18, properly joined with the tank lining and having suitable tight joints between the same and the jacket or other parts of the walls of the tank, serves to provide the necessary communication between the interior of the tank and the several connections or appliances.

I claim:

1. An insulated liquid storage tank having an inner lining, and an outer insulating jacket, and provided in the lower portion of a wall of the tank with a covered manhole, and provided with an opening through a wall of the tank at the upper portion of the tank, and a door which closes the said last mentioned opening and is movable and adapted to be opened to admit light and air to the tank, said door being provided with a plurality of holes therethrough which serve different purposes requiring passages extending from the exterior to the interior of the tank.

2. An insulated liquid storage tank having an inner lining and an outer insulating jacket, and provided in the lower portion of a wall of the tank with a covered manhole, and provided with an opening through said lining and jacket at the upper portion of the tank, and a door which closes said last mentioned opening and is movable and adapted to be opened to admit light and air to the tank, said door being provided with a peep hole window and additionally provided with a hole therethrough for the communication of an appliance with the interior of the tank through said last mentioned opening.

3. An insulated liquid storage tank having an inner lining and an outer insulating jacket, and provided in the lower portion of a wall of the tank with a covered manhole, and provided with an opening through a wall of the tank at the upper portion of the tank surrounded by a fixed collar joined to said inner lining, and a door which cooperates with said collar and closes said last mentioned opening and is movable and adapted to be opened, said door being provided with a peep hole closed by a transparent pane and also provided with additional holes therethrough for the communication of a filling connection and another tank appliance with the interior of the tank.

RAYMOND J. NEELY.